(12) United States Patent
Wallace

(10) Patent No.: US 9,987,835 B2
(45) Date of Patent: Jun. 5, 2018

(54) SIMULTANEOUS PRODUCTION OF NESTED, SEPARABLE THERMOFORMED ARTICLES

(75) Inventor: Millard F. Wallace, Orwigsberg, PA (US)

(73) Assignee: Converter Manufacturing, LLC, Orwigsburg, PA (US)

( * ) Notice: Subject to any disclaimer, the term of this patent is extended or adjusted under 35 U.S.C. 154(b) by 574 days.

(21) Appl. No.: 13/293,922

(22) Filed: Nov. 10, 2011

(65) Prior Publication Data

US 2012/0119404 A1  May 17, 2012

Related U.S. Application Data

(63) Continuation-in-part of application No. 12/620,460, filed on Nov. 17, 2009, now abandoned, which is a continuation-in-part of application No. 11/734,285, filed on Apr. 12, 2007, now Pat. No. 7,721,910.

(60) Provisional application No. 61/412,382, filed on Nov. 10, 2010, provisional application No. 60/794,409, filed on Apr. 24, 2006, provisional application No. 60/855,597, filed on Oct. 31, 2006.

(51) Int. Cl.

| B29C 47/00 | (2006.01) |
|---|---|
| B32B 38/12 | (2006.01) |
| B29C 47/06 | (2006.01) |
| B29C 51/02 | (2006.01) |
| B29C 51/14 | (2006.01) |
| B29K 23/00 | (2006.01) |
| B29K 67/00 | (2006.01) |
| B29L 9/00 | (2006.01) |

(52) U.S. Cl.
CPC .......... *B32B 38/12* (2013.01); *B29C 47/0021* (2013.01); *B29C 47/065* (2013.01); *B29C 47/067* (2013.01); *B29C 51/02* (2013.01); *B29C 51/14* (2013.01); *B29C 47/0004* (2013.01); *B29K 2023/086* (2013.01); *B29K 2023/12* (2013.01); *B29K 2067/003* (2013.01); *B29L 2009/001* (2013.01); *B32B 2439/02* (2013.01)

(58) Field of Classification Search
CPC ......... B29C 51/06; B29C 51/00; B29C 51/14; B29C 51/26
USPC ........................................ 264/322, 101, 292
See application file for complete search history.

(56) References Cited

U.S. PATENT DOCUMENTS

| 4,411,849 A * | 10/1983 | Kohl ..................... B26D 3/001 264/130 |
|---|---|---|
| 2010/0200596 A1* | 8/2010 | Wallace ................... B32B 7/12 220/570 |

* cited by examiner

*Primary Examiner* — Christina Johnson
*Assistant Examiner* — Xue Liu
(74) *Attorney, Agent, or Firm* — Dilworth Paxson, LLP; Gary D. Colby

(57) ABSTRACT

A multilayer stack of polymeric sheets can be used in thermoforming processes to make objects wherein each sheet has substantially the same shape. The stack includes at least one sheet of a thermoformable polymer, and can include many such sheets. A barrier layer is interposed between at least an overlapping portion at least two of the polymeric sheets in order to prevent fusion of the sheets in the overlapping portion during the thermoforming process. The barrier layer can include an adhesive that adheres the sheets in the overlapping portion. In formed articles including such an adhesive, the sheets can be manually peeled from one another if a suitable adhesive is selected. The stack (and object formed using the stack) can include polymeric sheets that are not thermoformable, but are adhered to the surface of a thermoformable sheet.

16 Claims, 5 Drawing Sheets

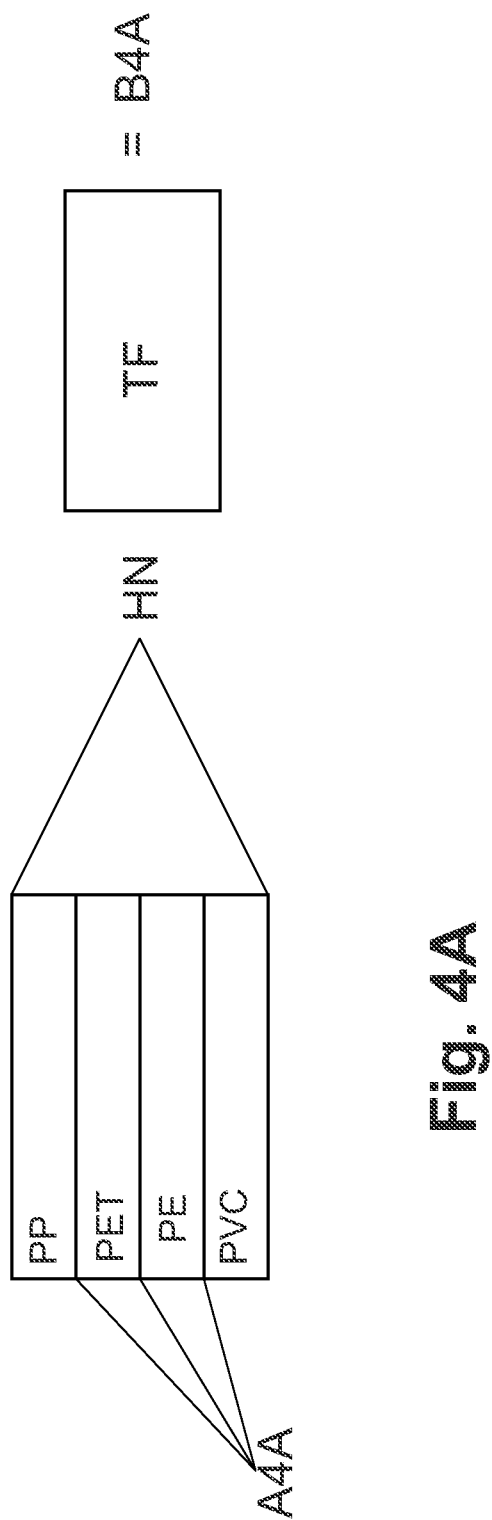

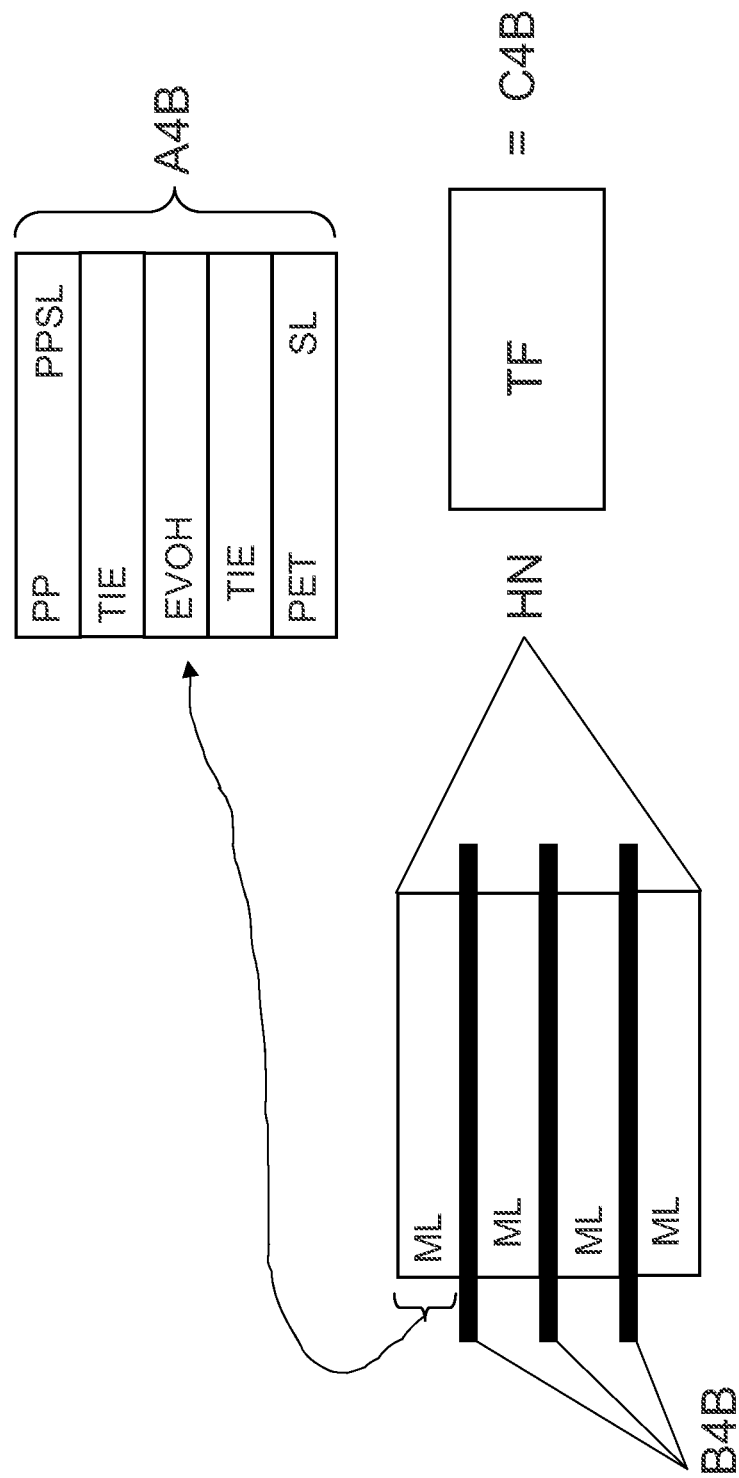

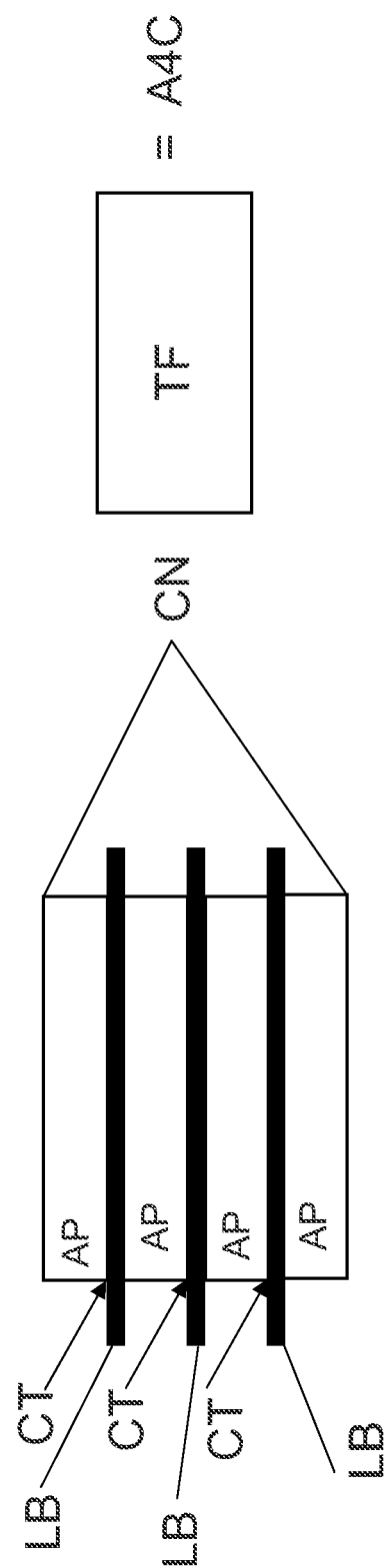

SIMULTANEOUS PRODUCTION OF NESTED, SEPARABLE THERMOFORMED ARTICLES

CROSS-REFERENCE TO RELATED APPLICATIONS

This application is a continuation-in-part of co-pending U.S. patent application Ser. No. 12/620,460, filed 17 Nov. 2009, which is a continuation-in-part of U.S. patent application Ser. No. 11/734,285, filed Apr. 12, 2007 (now U.S. Pat. No. 7,721,910) which, in turn, claims the benefit of the filing dates of U.S. provisional patent application No. 60/794,409, filed Apr. 24, 2006, and U.S. provisional patent application No. 60/855,597, filed Oct. 31, 2006; this application is also entitled to priority to U.S. provisional patent application No. 61/412,382, filed Nov. 10, 2010; each of the foregoing applications is incorporated herein by reference in its entirety.

BACKGROUND OF THE DISCLOSURE

This disclosure relates generally to methods of making multiple-polymeric-layer thermoformed articles.

Thin plastic trays, sheets, liners, and other shaped articles have a wide variety of uses and functions.

Thin plastic trays are used for storage, shipping, and display of food items such as cookies (e.g., a three-trough tray for holding creme-filled sandwich cookies in rows of multiple cookies during shipping and sale), baked goods (e.g., a display box having a thin plastic insert that prevents shifting of and damage to delicate baked goods such as cupcakes or tarts during display and sale), and produce (e.g., an in-box separator that secures delicate fruits during shipping).

Thin shaped plastic articles are commonly used as disposable plates, cups, lids, and containers for holding, storing, protecting, or manipulating food and other items at the point of sale or consumption. Examples of such articles include plastic plates, beverage cup lids, salad bar trays and containers, clear lids for sealing foil food containers, and the like.

Disposable plastic liners, covers, and shields can also be used to provide a sanitary surface in environments in which soiling or contamination of a surface frequently occurs. In such environments, use of disposable plastic articles can significantly reduce the time and expense needed to maintain sanitation. By way of example, food service stations (e.g., buffet tables) have refillable food containers that typically must be cleaned or replaced prior to refilling with fresh food items. If the used surface of the container could be removed while leaving the container in place with a fresh, sanitary surface, delay and cost associated with cleaning or replacing the container could be avoided.

Disposable plastic liners and articles are also useful in situations in which the surface of an article becomes soiled and it is preferable, economically or aesthetically, to dispose of the soiled surface or article without cleaning it. By way of example, the surface of toilet seats, trash cans, and pet litter containers can harbor hazardous, malodorous, or distasteful substances and these substances can be difficult to remove safely and completely. If these articles were economically disposable or had removable liners which were conveniently and economically disposable, the difficulty of cleaning the articles and their surfaces can be avoided.

Use of disposable articles, trays, sheets, and liners in these and other circumstances is well known. Heretofore, significant difficulties have been experienced in making disposable articles and liners that can be economically and conveniently used. Machinery and operations for making individual liners, trays, inserts, and other thin shaped plastic articles are well known and frequently involve thermoforming plastic sheets to form articles having a shape adapted to fit the desired use. However, assembling, packaging, and installing multiple shaped plastic articles has been difficult and, in some instances, impossible. The very high tolerances required to stack or layer disposable plastic articles within one another and at their intended location of use is beyond the capacity of most processes for mass-producing the articles. As a result, many shaped plastic liners and other articles can only be installed one-at-a-time, rather than in a format permitting serial removal of individual articles from a multi-article bundle. Even for shaped articles for which nesting or stacking is not required or difficult, the economy of shaped plastic articles has been limited by the need to make individual shaped articles one at a time in, for example, a thermoforming mold.

There is a continuing need for a method of manufacturing a plurality of formed articles more efficiently and in a manner better adapted for providing multiple shaped articles in a nested conformation. The subject matter disclosed herein satisfies this need.

BRIEF SUMMARY OF THE DISCLOSURE

The subject matter described herein relates to methods of forming nested, separable, thermoformed articles. The methods involve assembling a stack comprising a plurality of polymer sheets and thermoforming the assembled stack. The polymer sheets are thermoformable at a thermoforming condition, are assembled such that they overlap in an overlapping region, and that include at least two adjacent sheets that do not fuse to one another at the thermoforming condition. The thermoforming is performed at the thermoforming condition. Upon thermoforming, the stack assumes the shape of the articles and the adjacent sheets are separable from one another in the overlapping region. Thermoforming the stack thereby yields the nested, separable articles.

In these methods, the composition of the sheets should be selected such that each article exhibits sufficient rigidity to retain its shape following thermoforming and sufficient toughness to resist tearing under conditions necessary to separate the articles. The composition of the stack can also be selected such that each sheet in the stack is incorporated into a shaped article at the thermoforming condition.

In one embodiment, neither of the adjacent sheets is thermoformable at the thermoforming condition. In others, at least one or both of the adjacent sheets is thermoformable at the thermoforming condition.

The two adjacent sheets can have surface layers composed of plastics that do not fuse with one another at the thermoforming condition, the surface layers being opposed on opposite sides of a gap (e.g., one which contains no solid or liquid). Preferably, substantially all gas is removed from the gap prior to thermoforming the stack, such as by compressing the stack, by reducing the atmospheric pressure within the gap, or both. One or more of the sheets can be multilaminar sheets each of which comprises multiple layers laminated such that they do not delaminate at the thermoforming condition.

The method described herein can be performed with a barrier liquid interposed between the two adjacent sheets as the stack is thermoformed. In that way, the methods can be performed using two adjacent sheets that would fuse at the thermoforming condition but for the presence of the barrier liquid therebetween. Preferably, the barrier liquid is a liquid that has a thermal conductivity greater than that of water at the thermoforming condition, such as a silicone oil. When a barrier liquid is used, the materials and conditions can be selected such that the barrier liquid remains associated with substantially only one of the two adjacent sheets when the adjacent sheets are separated following thermoforming. By way of example, association of the barrier liquid with substantially only one of the two adjacent sheets can be achieved by surface treating (e.g., by corona treatment, chemical treatment plasma treatment, flame treatment, surface polishing, or some combination of these) one of the adjacent sheets.

The method described herein can be performed with a composition interposed in a barrier layer between the two adjacent sheets as the stack is thermoformed. The barrier layer forms a frangible layer between the adjacent sheets following thermoforming. In that way, the methods can be performed using two adjacent sheets that would fuse at the thermoforming condition but for the presence of the barrier layer therebetween. The barrier layer can be selected to form a solid frangible layer. The barrier layer can, for example, be a polybutene. In one embodiment, the frangible layer remains attached to both of the adjacent sheets when the adjacent sheets are separated following thermoforming. The barrier composition can include an adhesive.

The method described herein can be performed using adjacent sheets that comprise polymer layers that do not fuse or adhere to one another at the thermoforming condition. By way of example, one adjacent sheet can include a polymer layer comprising a polyethylene and another adjacent sheet can include a polymer layer comprising a polyester.

In the methods described herein, at least a first polymer sheet can be provided in rolled form. In such methods, the stack is assembled by unrolling a portion of the first sheet from its rolled form, situating the unrolled portion of the first sheet such that it overlaps in the overlapping region with the other polymer sheets, and urging the unrolled portion of the first sheet and the other polymer sheets against one another in the overlapping region sufficiently to substantially remove gases from between the sheets. The assembled stack can thereafter be thermoformed at least the overlapping region. Two or more (or even all) of the polymer sheets can be provided in rolled form. Unrolled portions of polymer sheets can be tensioned as they is situated and urged against other polymer sheets.

The stack described herein can be assembled within a thermoforming apparatus or prior to entry into a thermoformer (e.g., more than one minute, more than one hour, more than one day, more than one week, or more than one month prior to thermoforming the assembled stack. The assembled stack can also be maintained in a rolled form prior to thermoforming it.

BRIEF DESCRIPTION OF THE DRAWINGS

FIG. 4, comprising FIGS. 4A, 4B, 4C, and 4D is a quartet of diagrams which illustrate four ways in which the stack described herein can be assembled. FIG. 4A relates to use of dissimilar monolayer plastics and that due to all removable layers being dissimilar they are non miscible (will not adhere to each other at the thermoforming conditions) but their individual shrink rates and diverse properties will not be good; "A4A" designates corona treat or any treat to make sheets bond to each other enough to get through the thermoformer; HN means hot nip; TF means thermoformer, and B4A designates 4 parts that fall apart from each other. FIG. 4B relates to use of a coextruded sheet, which uses the same theory as dissimilar materials and a best practice (placing the same multi structure over another for symmetry); "A4B" designates an example of multi layer; "B4B" designates that while barriers are not needed can be (adhesive, blooming additives, liquid, peelable sealable, corona, chemical treat, etc.) BEST PRACTICE=corona treat skin layers Due to the skin layers being non miscible the PET and PP will not bond at thermoforming temperatures; HN means hot nip; TF means thermoformer; ML means multi layer "C4B" designates 4 parts that fall apart from each other; "PPSL" means polypropylene skin layer; and "SL" means skin layer. FIG. 4C relates to use of a liquid barrier, which is created for similar plastic layers (example: all PE or all PET) but also can be used on dissimilar plastic structures; CT means corona treat; LB means liquid barrier that is designed to remain only on one side and not split in half like peelable sealants (example: via corona treatment); AP means any plastic; CN means cold nip; TF means thermoformer; "A4C" designates 4 parts that peel apart from each other. FIG. 4D relates to use of a peelable extrudable adhesive with any plastics permanently tied to a peelable extrudable adhesive (problem is to date the peel strength for this technology is aggressive); PES means peelable extrudable sealant; AP means any plastic; HN means hot nip; TF means thermoformer; "A4D" designates 4 parts that peel apart from each other; and "B4D" is a reminder that peelable sealant sticks permanently to the plastic but splits in half from itself.

DETAILED DESCRIPTION

Figure 1:
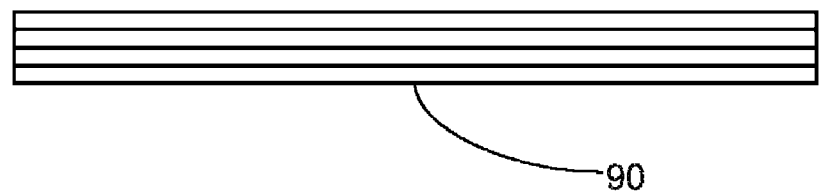
FIG. 1 is a side view of a stack of thermoformable polymer sheets.

This disclosure relates generally to methods of making thermoformed articles, including nested, separable articles that are formed by thermoforming a multi-layer stack. Terms such as horizontal, upright, vertical, above, below, beneath, and the like, are used solely for the purpose of clarity in illustrating the subject matter disclosed herein, and should not be taken as words of limitation. The drawings are for the purpose of illustrating the subject matter disclosed herein and are not intended to be to scale.

As a general matter, this disclosure supplements applications to which priority is claimed by including additional details and developments which have been devised since filing of the earlier applications, while preserving the disclosure of the underlying technology.

Definitions

A polymer is "thermoformable," as used herein, if the polymer retains a molded shape after being heated to a temperature at which it is relatively pliable, contacted with a mold, and then cooled to a temperature at which it is relatively rigid.

"Polyolefins," is used herein in its art-accepted sense, meaning polymerized alkenyl compounds, including polyethylene, polypropylene, resinous copolymers of ethylene and propylene, and polymers of ethylene and/or propylene with minor proportions of olefinically unsaturated monomers such as alpha-olefins having from 2 to 8 carbon atoms (e.g., 1-butene, 1-pentene, 1-hexene, 1-heptene, 1-octene and mixed higher alpha-olefins).

"Linear low density polyethylene" ("LLDPE"), is used herein in its art-accepted sense, meaning copolymers of ethylene with one or more comonomers selected from alpha olefins (preferably C-4 to C-10 alpha olefins such as butene-1 or octene) in which the copolymer molecules are in the form of long chains having few side chain branches or cross-links. This structure is in contrast with conventional low density polyethylenes, which are more highly branched than LLDPE. The density of LLDPE is normally in the range of from about 0.916 to about 0.925 grams per cubic centimeter.

"Linear medium density polyethylene" ("LMDPE"), is used herein in its art-accepted sense, meaning copolymers of ethylene with one or more comonomers selected from alpha olefins (preferably C-4 to C-10 alpha olefins such as butene-1 or octene) in which the copolymer molecules are in the form of long chains having few side chain branches or cross-links. This structure is in contrast with conventional medium density polyethylenes, which are more highly branched than LMDPE. The density of LMDPE is normally in the range of from about 0.926 to about 0.941 grams per cubic centimeter.

"Low density polyethylene" ("LDPE"), is used herein in its art-accepted sense, meaning copolymers of ethylene, optionally with one or more comonomers selected from alpha olefins (preferably C-4 to C-10 alpha olefins such as butene-1 or octene) as minor components. This structure is in contrast with conventional medium density polyethylenes, which are more highly branched than LDPE. The density of LDPE is normally in the range of from about 0.910 to about 0.940 grams per cubic centimeter.

"High density polyethylene" ("HDPE"), is used herein in its art-accepted sense, meaning polymers of ethylene, optionally with one or more comonomers selected from alpha olefins (preferably C-4 to C-10 alpha olefins such as butene-1 or octene) as minor components. The density of HDPE is greater than 0.941 grams per cubic centimeter.

"High molecular weight polyethylene" ("HMWPE"), is used herein in its art-accepted sense, meaning polymers of ethylene, optionally with one or more comonomers selected from alpha olefins (preferably C-4 to C-10 alpha olefins such as butene-1 or octene) as minor components. The molecular weight of the polymer chains is typically in the millions, usually between 3 and 6 million.

"Ethylene vinyl acetate" ("EVA"), as used herein, is a known chemical entity and refers to copolymers of ethylene and vinyl acetate monomers. Normally, the ethylene-derived units of the copolymer are present in major amounts, such as between about 60% and 98% by weight and the vinyl acetate derived units in the copolymer are present in minor amounts, such as between about 2% and 40% by weight.

"Ethylene vinyl alcohol" ("EVOH"), as used herein, is a known chemical entity and refers to saponified or hydrolyzed ethylene vinyl acetate polymers, and refers to a vinyl alcohol polymer prepared by, for example, hydrolysis of a vinyl acetate polymer, or by polymerization of polyvinyl alcohol. The degree of hydrolysis should be at least 50% and is more preferably at least 85%. EVOH is normally sued in the form of a copolymer of EVOH and a polyolefin comonomer (e.g., polyethylene). The polyolefin component can, for example, be present in the range of about 15 to about 65 mole percent.

"Polyamides," is used herein in its art-accepted sense, meaning polymers having amide linkages among the molecular chains. Polyamides include nylons and aramids, for example. The term "polyamides" also includes polyamide copolymers, such as nylon 6 and nylon 12.

"Aromatic polyesters," is used herein in its art-accepted sense, meaning polymers derived from homopolymers and copolymers of alkyl ester monomers which include an aromatic moiety, such as polyethylene terephthalate ("PET"), polybutylene terephthalate, copolymers of isophthalate (e.g., polyethylene terephthalate/isophthalate copolymer), cycloaliphatic esters, and blends of these. Useful PETs include amorphous PET ("APET"), crystalline PET ("CPET"), recycled PET ("RPET"), and glycol-modified PET ("PETG").

"Polyacrylates," is used herein in its art-accepted sense, meaning polymers that include linked alkyl acrylate monomers, including copolymers which include different acrylate monomers (including alkyl acrylate monomers, for example) and/or polyolefin monomers. Examples of suitable polyacrylates include ethylene/alkyl acrylate copolymers, ethylene/methyl acrylate copolymers, ethylene/ethyl acrylate copolymers, ethylene/butyl acrylate copolymers, and ethylene/methyl methacrylate copolymers.

"Polyurethanes," as used herein, refer to polymers having organic monomers with carbamate linkages.

"Polybutenes" refers to polymers and polymer blends that contain polybutene or polyisobutene and that have adhesive properties, as generally known in the art.

The unit "mil" is used in its art-accepted sense, namely one one-thousandth of an inch in the English measurement system.

An "odor-resistant polymer" is a polymer that substantially inhibits migration of a gas therethrough. The ability of a polymer to inhibit migration of a gas therethrough depends on the properties (e.g., chemical nature, thickness and density) of the polymer. These properties can be empirically determined, as is typically done by ordinarily-skilled artisans in this field (e.g., by measuring passage of the gas across a polymer membrane having controlled characteristics under controlled conditions, such as gas concentration and pressure differential across the membrane). By way of example, polyvinyl acetate (PVA) and polyvinyl alcohol (PVOH) polymers are known to exhibit significant gas-barrier properties under a wide range of conditions, and are known to exhibit significantly lower gas-barrier properties under humid conditions or when saturated with water.

A polymer sheet that contacts an oily or aqueous liquid and has an "anti-permeation" polymer layer is a sheet that includes a polymer layer that substantially inhibits flux of the liquid through the layer. For example, an anti-permeation polymer layer should inhibit flux (i.e., rate of transfer per unit area) of the liquid into a substrate capable of absorbing the liquid by at least 50% when the anti-permeation polymer layer is interposed between and contacts both the liquid and the substrate, relative to the flux when the liquid directly contacts the substrate. Preferably, the flux should be inhibited by at least 90% for the first four hours of liquid-layer-substrate contact. The flux inhibition should endure for at least four, and preferably eight, twelve, twenty-four hours, or longer.

As used herein, the "scratch-resistance" of a polymer sheet or layer is a relative term that depends on the anticipated conditions of use to which the polymer sheet will be exposed. A polymer sheet is "scratch resistant" if it substantially retains its barrier properties (i.e., resistance to permeation by a liquid or a gas) under the peak scratching conditions to which it will normally be exposed in use. By way of example, use of laminated polymer sheets is described herein for providing peelable layers for food service containers in which food items and utensils such as spoons and forks will be inserted. Scratch-resistance in this context means that a polymer sheet that contacts the spoons or forks under ordinary use conditions (e.g., scooping or scraping out food items) will substantially retain (i.e., retain 90% or more of) its barrier properties following such contact.

A "laminated" sheet is a sheet having multiple, substantially parallel planar layers, without regard to the means of attachment between the layers and without regard to the method by which the layers are assembled or attached. A laminated sheet having multiple layers can be made by coextrusion of the layers to form a single sheet or by adhesion of multiple, separately formed sheets, for example.

A "tie layer" interposed between two polymers sheets is a material which bonds to each of the two sheets and thereby bonds the two sheets together.

Two sheets of material within a laminated sheet are bound "relatively tenaciously" when the three required to separate the two sheets from one another is greater than the force required to peel the laminated sheet from a surface to which the laminated sheet is adhered.

Two polymer sheets are "nested" if a first one of the sheets has a shape including a convex area and the second sheet is substantially parallel to and opposed against the first sheet within the convex area. Similarly, additional sheets are nested within the first two if they are parallel to and opposed against the second sheet or any intervening sheet within the convex area.

Two nested polymer sheets are "separable" if the sheets can manually pulled apart by a human of ordinary strength without substantially damaging either sheet.

A polymer sheet is "peelable" if the sheet can be peeled from a surface to which it is releasably adhered by a human of ordinary strength without substantially damaging the surface and without substantially tearing the sheet (or delaminating it if it is a laminated sheet). Put another way, the sheet is "peelable" if it is sufficiently flexible and has sufficient tensile strength that it can be peeled away from the surface without tearing.

A sheet is "adhesed" to an underlying surface if an adhesive that binds both the sheet and the surface is interposed between and contacts both the sheet and the surface, such that the adhesive binds the sheet to the surface. In contrast, a sheet is "adhered" to an underlying surface if the sheet binds the surface, regardless of whether an adhesive is interposed between the sheet and the surface. By way of example, a sheet that binds with an underlying surface in the absence of an interposed adhesive, e.g., owing to the static electrical charges of the sheet and surface, is "adhered" to the surface, but is not "adhesed" to the surface.

An adhesive "peelably adheses" two polymer sheets if the adhesive binds both sheets, and yet remains associated with substantially only one of the sheets upon separation of the sheets.

An adhesive "cohesively adheses" two polymer sheets if the adhesive binds both sheets in an adhesed region and remains associated with the adhesed region of each of the two sheets (e.g., by tearing through the adhesive layer) upon separation of the sheets.

A polymer sheet is "releasibly" adhered to a surface if the sheet can be dislodged from the surface (e.g., by peeling) without tearing, delaminating, or breaking the sheet or the surface.

A polymer sheet is "pliable," as used herein, if the sheet can be substantially deformed (e.g., bent, folded, or crumpled) by application of ordinary human strength without substantially fracturing or tearing the sheet. A pliable polymer sheet preferably is "freely pliable," meaning that it can be relatively easily deformed by application of minimal human strength, analogously to the pliability of normal writing paper, plastic garbage bags, or plastic grocery bags.

Description

Disclosed herein are methods for making nested, separable articles in a thermoforming process. Thermoforming is an operation commonly used to make shaped articles from flat plastic feedstock, from rolled sheets of plastic, from plastic sheets as they are being formed, or the like. Obviously not all plastics can be thermoformed. Instead, thermoformable plastics must be used, so that they can be deformed upon heating and retain their formed shape upon cooling.

Presently, thermoforming operations are performed by shaping a single sheet of plastic at a time (although such sheets may be laminates having multiple polymer layers in one sheet) to form one shaped article per thermoforming operation. Thermoforming of multiple sheets has not been practiced owing to difficulties encountered, such as fusion of the sheets within the thermoformer. While such fusion may be advantageous to form a single article from multiple sheets of laminar plastic feedstock in a single thermoforming operation, others have not been able to form multiple, nested articles that are practically separable from one another after the thermoforming operation. The methods disclosed herein permit formation of multiple, separable articles in a single thermoforming operation.

Generically stated, the methods described herein are used to form nested, separable, thermoformed articles. The methods involve assembling a "stack" that includes a plurality of thermoformable polymer sheets that overlap in an overlapping region. The assembled stack is thermoformed (e.g., using a mold, press, or other shaping implement known in the thermoforming arts) at a selected thermoforming condition. The stack assumes the shape of the desired articles in the overlapping region (or a portion thereof) upon thermoforming. Upon cooling, the adjacent sheets in the shaped stack are separable from one another in the overlapping region. Prior to separating the thermoformed sheets, the shaped portion of the overlapping region includes nested, separable articles. Those articles can be separated shortly (e.g., seconds, minutes or hours) after thermoforming or shipped or stored for longer periods (e.g., days, weeks, or months) in their nested conformation.

In this process, a thermoforming condition is selected at which the thermoformable sheets can be thermoformed, if not all of the sheets in the stack are thermoformable at the thermoforming condition, the non-thermoformable sheets must nonetheless be sufficiently deformable at that condition that thermoforming of the thermoformable sheets of the stack is not prevented. By way of example, the stack may include a pliable polymer sheet which is able to deform to the shape of the article formed at the thermoforming condition but which is not itself thermoformable (i.e., which does not retain the article shape following the thermoforming operation if thermoformed alone). The composition of the sheets is selected so that the articles formed in the process exhibit sufficient rigidity to retain their shape following thermoforming and sufficient toughness to resist tearing under conditions necessary to separate the articles.

A critical criterion is that the stack must be assembled in such a manner that the two adjacent sheets do not fuse to one another at the thermoforming condition. Such non-fusion can be achieved in several different ways which are described elsewhere herein.

No fewer than four particular types of thermoforming operations are contemplated, herein designated the "Dissimilar Plastics Method," the "Multilayer Sheet Method," the "Liquid Barrier Method" and the "Frangible Layer Method."

The Dissimilar Plastics Method

In this type of operation, the stack is assembled using and including at least two sheets of plastics which do not fuse with one another at the thermoforming condition. The two sheets are urged against one another and subjected to a thermoforming condition at which each of the two sheets can be thermoformed. Owing to the non-fusion of the two sheets, the thermoformed sheets can be separated from one another following the thermoforming operation.

In a variation of this method, multiple polymer sheets that do fuse at the thermoforming condition can be used, provided that they are either separated from one another by at least one polymer sheet with which they do not fuse. By way of example, a five-sheet stack including two identical PP sheets on either side of a PET sheet (i.e., PP-PP-PET-PP-PP) can be thermoformed to yield three shaped articles. In this example, the two pairs of PP sheets will fuse with one another and be shaped at the thermoforming condition, the PET sheet will be shaped at the thermoforming condition, but will not fuse with either pair of PP-PP sheets, and the shaped PET sheet will be separable from each of the two shaped and fused PP-PP sheet pairs following thermoforming.

By way of example, polypropylenes (PPs) generally do not fuse with PETS under at least some conditions at which both plastics can be thermoformed. Similarly, PVCs generally do not fuse with PEs under at least some thermoforming conditions, and PEs do not fuse with PETs under at least some thermoforming conditions. If, as illustrated in FIG. 4A (labeled "dissimilar monolayer plastics"), four sheets of plastic, being (listed in order from one face to the other of the stack) a PP, a PET, a PE, and a PVC are assembled into a stack, compressed tightly against one another (e.g., using a hot nip roller that heats the plastics to or beyond their softening points and urges the sheets against one another sufficiently to expel any substantial air pockets from between the sheets), and subjected to molding at a thermoforming condition at which all of the sheets can be thermoformed, and then cooled, then four molded articles will be formed (i.e., one in each of the four sheets), and the four articles will be separable from one another, based on non-fusion of the adjacent plastic layers at the thermoforming condition.

By contrast, if four monolithic sheets of an identical polymer were thermoformed in this manner, the four sheets would fuse with one another at the thermoforming condition, and only a single article (with a thickness of approximately the four sheets) would be formed. That is, fusion between the polymer sheets would prevent separation of the four sheets after thermoforming.

The Multilayer Sheet Method

In this type of operation, the stack includes at least a first multilayer polymer sheet having two or more polymer layers. The stack also includes at least one second polymer sheet that does not fuse with at least one of the two layers at the thermoforming condition when the second polymer sheet and the layer are compressed together at that condition. It is immaterial whether the layer of the first multilayer sheet that is not opposed against the second polymer sheet would fuse with the second polymer sheet at the thermoforming condition. The second polymer sheet can be a monolithic polymer sheet or it can be a second multilayer polymer sheet, so long as the polymer at the face of the second sheet does not fuse with the layer of the first multilayer polymer sheet.

This method allows use of multiple multilayer polymer sheets, so long as the faces of at least one adjacent pair of multilayer polymer sheets do not fuse at the thermoforming conditions. In one embodiment, the stack includes numerous (e.g., 3, 5, 10, or 20 or more) identical multilayer sheets that are stacked atop one another, each sheet having an upper face and a lower face. Most or all of the multilayer sheets are stacked in an identical conformation, so that between adjacent sheets, the upper face of one sheet contacts the lower face of the adjacent sheet. When such a stack is thermoformed at the thermoforming condition, each of the multilayer polymer sheets assumes a shape (the sheets being nested within one another at shaped portions) and the shaped sheets are separable from one another following the thermoforming operation.

An example of this method is shown in FIG. 4B (labeled "Coextruded sheet"), in which multiple sheets of a tri-layer polymer sheet are assembled into a stack for thermoforming. Each of the tri-layer polymer sheets includes a PP layer at one face and a PET layer at a lower face. An EVOH layer is interposed between the PP and PET layers and adhered to each of those layers using an appropriate tie composition that tenaciously adheres the layers within each sheet. To assemble the stack, multiple tri-layer polymer sheets are stacked atop one another, with the PET layer of each sheet (other than one of the end sheets) contacting the PP layer of an adjacent sheet. Upon subjecting the stack to the thermoforming condition, one or both of the PP and PET layers (and, optionally, the EVOH layer as well) are thermoformed, but the adjacent PP and PET layers do not fuse with one another.

As with the Dissimilar Plastics Method, it is important that the spaces between adjacent sheets be free of air, dust, dirt, or other materials that would prevent close opposition of adjacent sheets or that would significantly inhibit heat transfer between the adjacent sheets. So long as substantially all air is expelled from between the sheets (which would lead to "bubble" formation between the sheets as the air were heated at the thermoforming condition), no binder, liquid barrier, frangible layer, or other material need be interposed between the sheets, because the dissimilarity of the plastic layers that contact one another at the thermoforming condition will prevent fusion between the sheets.

It is immaterial how the multi-layer sheets are formed, and they can be formed by substantially any known methods for laminating, adhering, adhesing, co-extruding, coating, or otherwise tenaciously adhering polymer sheets to one another. Moreover, if desired, the multi-layer sheets can include sheets that are separable from (e.g., peelably adhered to) one another following thermoforming. Thus, for example, a stack including multiple bi-layer sheets, wherein the two layers of the bi-layer sheets are peelably adhered to one another, can be thermoformed to yield multiple tray-shaped items, wherein each tray-shaped item has a peelable surface layer.

The Liquid Barrier Method

In this type of operation, the stack is assembled from multiple sheets of thermoformable plastic, including at least two sheets that would fuse at the thermoforming condition but for the presence of a liquid barrier composition interposed between the two sheets. The liquid barrier composition has a composition selected such that it coats the surface of at least one of the two sheets at substantially all portions of the area at which sheet fusion is not desired and facilitates sufficient heat transfer that the stack can be thermoformed at the thermoforming condition.

The liquid barrier preferably completely coats the surface of one or both adjacent sheets at the thermoforming condition, thereby preventing fusion of the sheets, presumably by physically separating the two fusible surfaces. Coating of one or both surfaces can be enhanced by surface treatment of one or both surfaces, such as flame treatment, corona discharge treatment, plasma treatment, surface polishing, or chemical modification of the surface. Preferably, the selections of the liquid barrier composition and the surface treatments are such that the liquid barrier composition remains associated with substantially only one of the two surfaces upon separation of the two sheets after thermoforming.

Substantially any liquid that coats one or both surfaces, does not degrade or evaporate at the thermoforming condition, and prevents fusion of the adjacent sheets at the thermoforming condition can be used. Various oils (e.g., silicone oils) are suitable for this purpose, for example.

When a liquid barrier composition is interposed between adjacent sheets, it is immaterial whether the compositions of the adjacent sheets are identical, different, or non-fusible, since the liquid barrier composition prevents fusion anyway. The liquid barrier composition may be used between adjacent sheets that would not fuse, even in the absence of the liquid barrier.

An advantage of using the liquid barrier composition is that it physically fills spaces between adjacent sheets (i.e., excluding air and other gases that could expand to form "bubbles" during thermoforming operations). Thus, it is not necessary that the adjacent sheets conform to the surfaces of one another as closely as in operations in which no liquid barrier is used. Because close conformance is not necessary, a hot nip roller (or equivalent device or method) is not needed. Instead, a cold nip roller, for example, can be used to bring the sheets into relatively close conformity to one another, with the liquid barrier filling any remaining gaps prior to feeding the liquid-filled assembled stack into the thermoforming apparatus. An example of this process is illustrated in FIG. 4C (labeled "liquid barrier").

Although the liquid barrier composition should be a liquid at the thermoforming condition, it is not necessary that it remain in liquid form thereafter. If the liquid composition assumes a solid (or gel-like) form after thermoforming, its removal from one or both of the adjacent sheets can be facilitated.

The Frangible Layer Method

Rather than filling the inter-sheet space with a barrier composition that remains a liquid during and after thermoforming, the space can be filled with a composition that forms a frangible layer between the sheets after thermoforming, such that the sheets can be separated from one another after thermoforming by rupturing the frangible layer (i.e., rather than delaminating the layer from one or both sheets or tearing one or both sheets). The frangible layer is preferably applied in the form of a liquid, such that it fills the inter-sheet gap and displaces air or other gases therefrom. Alternatively, the frangible layer can be applied in a non-liquid form that becomes liquid at the temperature of a hot nip roller (for example) used to compress the adjacent sheet having the frangible layer material therebetween and/or at the thermoforming condition.

The frangible layer material, the surface treatments of the adjacent sheets, or both are preferably selected such that the frangible layer remains associated with each of the adjacent sheets when the two sheets are separated. Alternatively, these can be selected such that the frangible layer remains associated with only one of the two sheets (although this largely defeats the purpose of having a frangible layer, and is more akin to a liquid barrier composition that reverts to solid form and is substantially completely removable from one surface after thermoforming.)

A wide variety of materials are know for forming frangible layers. Among the more widely known materials are polybutene adhesives. Polybutenes tend to form tearable layers that can be bound with other polymers and which rupture within the polybutene layer. Such ruptured layers tend to have a rough appearance, which can demonstrate that the frangible layer has been ruptured.

Figure 4D:
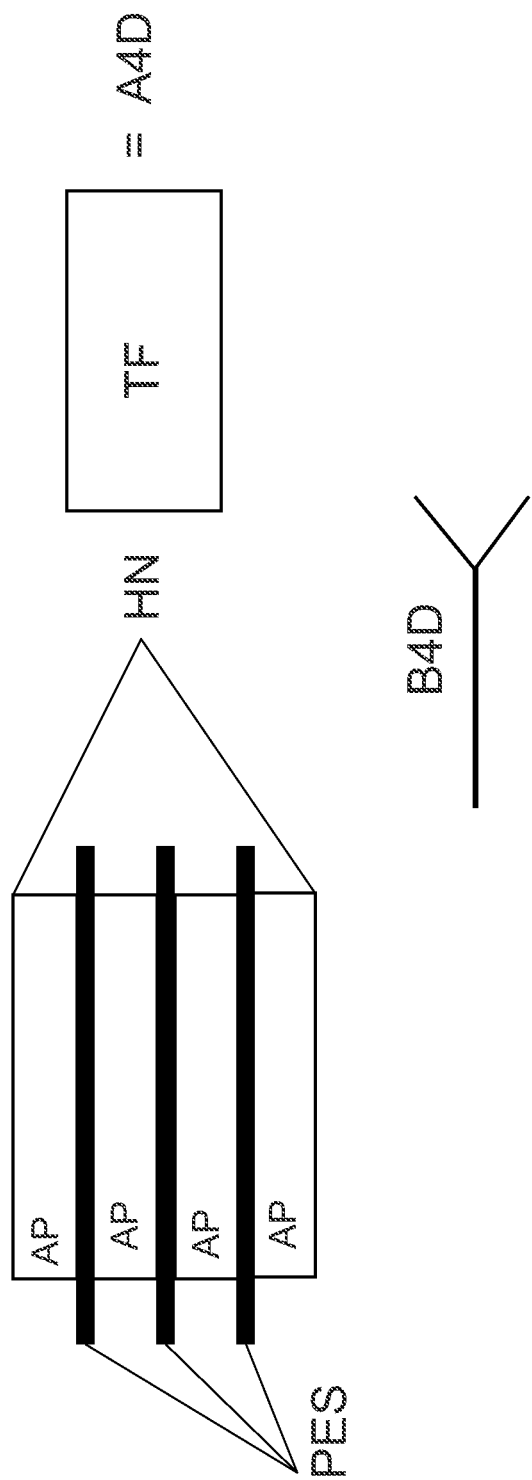

An example of use of a frangible layer is illustrated in FIG. 4D (labeled "peel able extrudable adhesive"). In this example, a frangible layer is interposed between adjacent polymer sheets prior to thermoforming. The frangible layer prevents fusion between polymer sheets during thermoforming, and the resulting nested, thermoformed articles can be separated from one another by rupturing the frangible layer between adjacent articles.

The Stack

In one aspect, the subject matter of this disclosure relates to a thermoformable stack. The stack includes a first sheet of a thermoformable polymer and at least a second polymeric sheet (sometimes referred to herein as a "liner" sheet) that overlaps the first sheet at an overlapping region. In this aspect, the first and second sheets are the "two adjacent sheets" referred to elsewhere in this disclosure. The first and second sheets can have the same composition and thickness, or these characteristics can be different. The stack can include multiple second polymeric sheets (made of the same or different polymers and having the same or different thicknesses). The stack can also include sheets of other materials, such as metal sheets. A layer of a first barrier composition is interposed between faces of the first and second sheets in at least a portion of the overlapping region. The first barrier composition prevents fusion of the surfaces of the first and second sheets at the thermoforming condition. When the stack is subjected to the thermoforming condition, the first sheet assumes a thermoformed shape, the shape of the second sheet conforms to the shape of the first sheet, and the first and second sheets do not fuse in the portion of the overlapping region.

When the stack includes at least one pressure-deformable sheet, such as a metal sheet, as a first and/or second sheet, the stack can be shaped using ordinary bending, stamping, and other pressure-based shaping methods. Such stacks preferably include first and second sheets that can withstand pressure, shear, deformation, and stretching forces inherent in pressure-based shaping methods without tearing or becoming punctured. By way of example, thin, stretchable nylon sheets can be adhered to an aluminum sheet, with a first barrier composition interposed between the aluminum sheet and the adjacent nylon sheet and a second barrier composition interposed between adjacent nylon sheets. Such an aluminum/nylon stack can be subjected to a press that deforms the aluminum sheet into a desired shape, with the nylon sheets stretching to match the shape without becoming substantially de-adhered from the surface of the aluminum sheet or from one another. In this manner, shaped metal objects having peelable polymeric layers can be made, as can articles made from other pressure-deformable materials (e.g., uncured ceramic pastes).

The second sheet is made of a material that is selected such that it is capable of maintaining its structural integrity at a thermoforming condition at which the first sheet can be thermoformed. The second sheet is capable of conforming to the shape of the first sheet as the first sheet is thermoformed at the thermoforming condition. If desired, the second sheet can be a material that is also thermoformable at the thermoforming condition, but this is not a requirement. However, if a non-thermoformable second sheet is used, the second sheet may detach, deform, or pull away from the first sheet following thermoforming. Even if the second sheet is thermoformable, these behaviors can nonetheless manifest themselves if the first and second sheets are made of different materials (owing, for example, to different coefficients of thermal expansion). When the second sheet is a non-thermoformable material, the characteristics of the second sheet and any adhesive in the adjacent barrier compositions should be selected to retain the desired configuration of first and second sheets in the finished article. By way of example, if one or more of the second sheets is an elastic material, then the elastic material should be selected such that it can temporarily deformed at the thermoforming conditions, the adhesive(s) should be selected such that they will adherently oppose the tendency of the elastic material to resume its original shape after thermoforming, or some combination of these.

One or more tabs can be interposed between the first sheet and second sheets. If a tab extends beyond an edge of either sheet, the tab can be used to facilitate separation of the first and second sheets after thermoforming. The tab can be adhered to either sheet or to neither. In one embodiment, a tab is formed by folding a portion of a polymeric sheet in a stack over itself, such that the overlapping portions of the sheet adhere to each other, but not to other sheets, forming a tab.

Although a loose stack of polymeric sheets can be thermoformed using the materials and methods described herein, it can be convenient to bind the first and second sheets to one another prior to thermoforming (e.g., to facilitate combination, storage, shipping, handling, manufacture, and alignment of the sheets). The means used to bind the sheets to one another is not critical, but preferably does not affect the properties of the sheets in the region(s) of the sheets that are to be thermoformed. By way of example, the sheets can be bound together using a glue applied to a common edge of the first and second sheets, by fusion of a common edge of the first and second sheets, by stapling the first and second sheets together, by adhering the sheets together using an adhesive applied between the sheets at an inter-sheet area distinct from the shaped section of the sheets, or by other means.

In order to prevent detachment or deformation of the second sheet away from the first sheet after thermoforming, the first barrier composition can include an adhesive that peelably adheres the first and second sheets. By incorporating such an adhesive into the first barrier composition, thermoformed articles can be made in which the second sheet can be peeled away from the first sheet, preferably (i.e., by judicious selection of an adhesive) without tearing either of the first and second sheets. All, or only a portion, of the overlapping region can be coated with the adhesive-containing first barrier composition. When a tab is interposed between polymer sheets, the tab can be adhered to the adhesive and used to pull the edge of the sheet to which the tab is adhered away from the adjacent sheet to which the tab is not adhered. In alternative configurations, the adhesive can be incorporated into the barrier composition or the adhesive can be a composition discrete from the barrier compositions. By way of example, a barrier composition having perforations or holes therethrough can be interposed between sheets and a separate adhesive interposed between the sheets on one side of the barrier composition (i.e., the adhesive contacting both sheets through the holes or perforations).

An important embodiment of the subject matter disclosed herein is a stack (sometimes referred to herein as a "master pad roll" when provided in the form of a rolled stack) of overlapping polymeric sheets. This stack includes the first sheet, which is a thermoformable polymer, and a plurality (e.g., 2, 3, 6, 10, or 20) of second polymeric sheets. Each second sheet overlaps the first sheet at the overlapping region, is capable of maintaining its structural properties (i.e., each sheet maintains its integrity and, preferably, its pliability and approximate thickness) at the thermoforming condition, is capable of conforming to the shape of the first sheet as the first sheet is thermoformed at the thermoforming condition, and has a layer of a second barrier composition interposed between it and each adjacent second sheet in a portion of the overlapping region. The first barrier composition prevents fusion of the surfaces of the first sheet and the adjacent second sheet at the thermoforming condition. The second barrier composition (which may be identical to the first) prevents fusion of the surfaces of adjacent second sheets at the thermoforming condition. When the stack is subjected to the thermoforming condition, the first sheet assumes a thermoformed shape, the shape of each of the second sheets conforms to the shape of the first sheet, and the sheets do not fuse in the portion of the overlapping region. In this embodiment, each of the second sheets can have different, identical, or substantially the same composition. Likewise, the compositions of the first sheet and any or all of the second sheets can be different, identical, or substantially the same.

As with the first barrier composition, the second barrier composition can include an adhesive (i.e., the same adhesive as the first or a different adhesive). The second barrier composition peelably adheres adjacent second sheets. An article made by thermoforming a stack of this sort will have multiple peelable layers. Such articles are desirable when, for example, a renewably clean surface is required of an article, and particularly in situations in which cleaning of the surface is difficult, time-consuming, distasteful, or hazardous. In one embodiment, an article having a relatively thick (e.g., 10 to 40 mils) base (substrate) layer made from a thermoformed polymer can have multiple thin (e.g., 1 to 7 mils) peelable layers that are separately, peelably adhered to the base. The base can provide shape and rigidity to the article (e.g., a paint tray or a toilet seat), and the peelable layers can provide a renewably clean surface upon peeling of individual layers.

The stack described herein has at least one second sheet on at least one face of the first sheet, as described above. Multiple second sheets can be arranged on the first sheet, adjacent one another, at a distance from one another, overlapping one another, or any combination of these. The second sheets can be stacked atop one another, with the edges of the stacked second sheets coinciding perfectly or nearly perfectly with one another, with the edges of each stacked second sheet completely covering one or more edges of the sheet over which it is stacked, with the edges of each stacked sheet receded away from one or more edges of the sheet over which it is stacked, or any combination of these. Furthermore, second sheets can be arranged on one or both faces of the first sheet. On each face of the first sheet, there can be a single second sheet, multiple non-overlapping second sheets, multiple partially-overlapping second sheets, or multiple stacked second sheets.

When tabs are interposed between adjacent sheets, at least a portion of the tab should extend beyond an edge of one of the adjacent sheets, to facilitate grasping of the tab. If an adhesive is interposed between the adjacent sheets, the tab can facilitate peeling of the adjacent sheets, particularly if the adhesive completely fills the gap (i.e., all the way to the edges of the sheets) between the adjacent sheets. If no adhesive is interposed between the adjacent sheets, the tab can nonetheless facilitate separation of the adjacent sheets by relieving any pressure between the inter-sheet gap, by providing a region in which electrostatic forces between the sheet surfaces are disrupted, or simply by providing a mechanical lever by which expansion of the inter-sheet gap can be initiated. In an advantageous embodiment, tabs are interposed between sheets in such a manner that the tabs between sheets alternate between one side of the shaped article (or stack) and the other side, for example so that peeling a sheet using a tab interposed between the top sheet and the next (i.e., underlying) sheet on the right side of the shaped article exposes a tab interposed between the next sheet and the third sheet on the left side of the shaped article. Particularly when stack materials are provided in rolled form, it can be advantageous to have the tabs arranged symmetrically along the sides of the rolls, so that the rolled stack material has approximately the same size at both ends of the roll.

The stack described herein can be prepared and provided in the form of multi-sheet leaves, folded bundles, or rolls, for example. In many polymer-processing operations, rolls of polymeric materials are preferred for ease of handling. Rolls of the stack described herein can be prepared simply by winding the stack about itself, or about a core such as a paper or wooden tube or cylinder, in a rotary fashion. In order to minimize unintended interactions between the bottom of the stack in one layer of the roll and the top of the stack in an adjacent layer of the roll, a release agent can be interposed between layers of stack as it is rolled. In one embodiment, the release agent is a sheet of a material such as paper or waxed paper. In another embodiment, the release agent is an oil or other liquid agent which inhibits or prevents irreversible interaction of stack layers. By way of example, a thin film of a silicone-based compound (e.g., a liquid polysiloxane-containing composition, such as a silicone oil) can be applied to the top, bottom, or both top and bottom of the stack as it is rolled. The release agent should either be an agent which does not affect thermoforming operations on the stack or an agent which can be separated from the stack prior to thermoforming operations.

Printed Matter

Images, text, designs, or other printed matter can be included on one or more of the sheets of the stack and articles made by thermoforming the stack. By way of example, label text and graphics can be printed on the outermost second sheet (i.e., the second sheet on the "top" of the stack, having no other second sheets atop it). Such label information can be printed on the exterior of the sheet (i.e., on the surface of the product) or, if the outermost second sheet is not opaque, the information can be printed on the inner surface (i.e., first-sheet-side) of that sheet. Such printed matter should encapsulated between the sheet and the barrier composition that is interposed between the outermost sheet and the adjacent sheet. Encapsulation of the printed matter can ensure that the printed matter is peeled off with the outermost sheet (i.e., does not adhere to the adjacent sheet) when the outermost sheet is peeled away from the adjacent sheet. Printed matter can be applied to the inner and/or outer faces of any of the sheets described herein in the same manner. Judicious selection of surface treatments (e.g., Corona treatment) and adjacent adhesives can ensure that the printed matter remains bound to a desired surface when the adjacent adhesive (and any polymeric or other sheet adhered to the desired surface by the adhesive) is peeled away, and selection of such treatments and adhesives to achieve this end is within the level of ordinary skill in this art.

When printed matter is included on a surface of the shaped articles described herein, the precise materials and methods used to print the matter on the surface are not critical, other than that they should be selected such that the printed matter will remain attached to the surface to which it is applied during normal use of the shaped article (unless detachment of the printed matter is considered acceptable). By way of example, in one embodiment of the thermoformed, multiple-peelable-layer paint tray disclosed herein, the outermost peelable layer is transparent and the printed matter is applied to the underside of that layer (i.e., the face of the layer that is adhered to the underlying surface) such that an adhesive in the barrier composition between that layer and the underlying surface adheres to the printed matter (and thence to the outermost layer) when the outermost layer is peeled away from the underlying surface, in another embodiment, the penultimate peelable layer (i.e., the second sheet adjacent the first sheet) is transparent and the printed matter (e.g., text reading, "This is the final peelable layer!") is applied to the underside of that layer (i.e., the face of the layer that is adhered to the surface of the first sheet) such that the printed matter is removed, together with any adhesive present in the first barrier composition, when the penultimate peelable layer is peeled away from the first sheet.

Shaped Articles

Included in embodiments of this disclosure are shaped articles that include multiple, substantially identically-shaped sheets of thermoformable polymers that overlap at an overlapping region. Interposed between each pair of sheets, in at least a portion of the overlapping region, is a layer of a barrier composition. Because the barrier composition prevents the sheets from fusing across their entire faces (i.e., the sheets do not fuse at the portions of the overlapping region at which the barrier composition is present when the sheets are thermoformed) the article is separable into multiple, substantially identically-shaped subarticles upon separation of the sheets. The barrier composition can be omitted from at least a portion of the gap at the overlapping portion of the sheets in order to form an article in which the substantially identically-shaped subarticles remain bound together at the overlapping portion that lacked the barrier composition during thermoforming. Alternatively, that portion of the gap can be filled with an adhesive to (reversibly or irreversibly) bind the overlapping portions corresponding to the sub-articles. Such bundles of subarticles can often be stored, shipped, handled, manufactured, and used more conveniently and more energy-efficiently than an equivalent number of separate subarticles, and the subarticles can be separated from one another at a convenient time and place simply by breaking, cutting, or otherwise separated from the bound overlapping portion. Such an article can include multiple (e.g., 2, 6, 10, or 20) discrete egg cartons, cookie trays, cups, blister packs, computer keyboard covers, or paint tray liners that can be separated from one another as desired.

The subject matter described in this disclosure includes a shaped article that includes a shaped thermoformable polymer sheet, a plurality of second polymer sheets, and first and second barrier compositions. The second sheets overlap the thermoformable sheet at an overlapping region and conform to the shape of the thermoformable sheet at substantially the entire overlapping region. The first barrier composition is interposed between and peelably adheres the thermoformable sheet and the adjacent second sheet. The second barrier composition is interposed between and peelably adheres adjacent second sheets. In an article of this type, the second sheets are peelably removable from the article. The article can include tabs interposed between adjacent second sheets and a tab between the thermoformable sheet and the adjacent second sheet. By way of example, the shaped article can be a paint tray having peelable liner layers, as described herein.

Further details of the materials and methods suitable for use in the articles, methods, and compositions described herein are provided in the ensuing sections of this disclosure.

Thermoformable Polymer Sheets

The identity and composition of thermoformable polymer sheets used in the articles and methods described herein are not critical. A skilled artisan will recognize that substantially any thermoformable polymeric material can be used. Examples of suitable thermoformable polymeric materials include polyesters, polyethylenes, polypropylenes, polyvinylchlorides, polystyrenes, and nylons.

A skilled artisan can select a thermoformable polymeric material, or combinations of such materials, suitable for use in substantially any application by considering such properties as the shrink rate, crystallinity, heat deflection temperature, tear strength, draw ratio, thickness, rigidity, melt temperature, thermal conductivity, and polymer backbone orientation of the materials. Selection of materials can also be guided by properties that do not necessarily directly impact the thermformability of the materials, such as cost, color, opacity, recycled material content, environmental impact, surface energy, chemical resistance, and surface sheen of the materials.

In selecting appropriate materials, an artisan should consider at least two sets of conditions: the environmental conditions to which the finished, shaped article will be subjected and the conditions that the materials will experience during the thermoforming process. Materials should be selected so as to exhibit the desired color, shape, strength, rigidity, and peelability, for example, once the materials have been shaped in the thermoforming process into their final, desired form. The materials should also be selected, together with the thermoforming conditions, so as to allow assembly and shaping of the materials into their final, desired form using thermoforming conditions available to the artisan.

Peelable Polymer Sheets

The identity and composition of peelable polymer sheets used in the articles and methods described herein are not critical. A skilled artisan will recognize that substantially any peelable polymeric material can be used.

In some embodiments, peelable sheets preferably have sufficient structural integrity that they do not tear or significantly stretch when subjected to forces necessary to peel them from surfaces to which they are adhered with a peelable adhesive. For example, when a paint tray having peelable surface layers is made as described herein, each of the peelable surface layers can preferably be peeled from the underlying surface as a single, integral sheet (i.e., no holes or tears) while containing paint coating their non-adhered surface. Peelable sheets that tear, stretch, or puncture are acceptable in embodiments in which containment of liquid within the peelable sheet is not required.

The peelable sheets are preferably thin and highly flexible. Sheets having a thickness in excess of 8 mils can be difficult to peel, and so sheets thicker than that are not preferred. The peelable sheets can be made from substantially any polymeric material(s) and by substantially any sheet-forming process. By way of example, suitable polymer sheets can be made by blowing, molding, casting, or extruding suitable polymer materials, or by some combination of these processes. When made of thermoformable materials, the peelable sheets are preferably thermoformed simultaneously with the substrate sheet of thermoformable material to which they are adhered. When made of non-thermoformable materials, the peelable sheets should be capable of maintaining their structural integrity at a thermoforming conditions at which the substrate sheet to which they are adhered is thermoformable.

Peelable sheets can be selected to be rigid (i.e., retain their shape after peeling, e.g., akin to prior art molded paint tray liners that can be lifted out of a paint tray and retain their shape when subjected to small forces) or substantially non-rigid (e.g., blown polymeric sheets such as the material used in trash can liners and trash bags).

The peelable nature of an individual peelable sheet can derive from surface attraction between the peelable sheet and the surface underlying it. Preferably, however, an adhesive is interposed between the sheet and the surface and the peelable nature of the sheet derives primarily from the adhesive forces exerted by the adhesive upon the sheet and the surface. An adhesive can be selected (e.g., based on the chemical identity or the surface treatment of the peelable sheet or the surface to which it is adhered) so that, upon peeling of the peelable sheet, the adhesive preferentially remains adhered to the peelable sheet, or to the surface. For instance, when the function of the peelable sheet is to expose the surface free of adhesive and other contaminants, the adhesive can be selected so that it both adheres the peelable sheet and the surface and adheres more strongly (i.e., more tenaciously) to the peelable sheet so that, upon peeling, the adhesive is removed from the surface along with the peelable sheet.

Differences in the tenacity with which an adhesive binds the opposed surfaces of two polymer sheets can be controlled in a number of ways, including by coating one or more portions of one surface with a composition that inhibits binding of the adhesive to the surface. Preferably, however, differences in the tenacity of adhesive-binding are controlled by selecting or treating the polymer sheets such that their opposed surfaces exhibit a difference in surface energies. If the difference between the surface energies of the two surfaces is relatively large—at least 5 Dynes—then the adhesive will bind significantly more tenaciously to one surface than the other. As the difference in surface energies of the two surfaces increases beyond 5 Dyes, the likelihood that all of the adhesive will remain with one sheet when the two sheets are separated increases. A difference of 5 to 14 Dynes between the adhered surfaces of the two sheets is considered appropriate.

It may be possible to separate two surfaces having an adhesive interposed between them, even if the surface energies of the surfaces differ by less than 5 Dynes. In this situation, the adhesive may adhere to each of the two surfaces with roughly equal tenacity, meaning that the adhesive may adhere to both surfaces (at various portions) after the two surfaces are separated from one another. In many applications, it is desirable to have most or all of the adhesive to adhere to the surface of only a single one of the polymer sheets (usually the one being peeled away from the remaining sheets or substrate). For such applications, the two surfaces contacted by the adhesive should preferably have surface energies that differ by at least 5 Dynes.

The amount of force needed to separate peelable sheets from their underlying surface is not critical, but is preferably sufficiently small to prevent tearing and substantial stretching of the peelable sheet upon manual peeling of the sheet from the surface. The amount of separation force needed is a function of the materials selected for the peelable sheets, the underlying surface, and any barrier composition or adhesive interposed between them. Practically speaking, the tenacity of adhesion between a peelable sheet and the underlying surface should be selected so that the sheet can be peeled away from the surface using normal human strength, but not so tenacious that the sheet must be torn or punctured by a person peeling the sheet from the surface. A skilled artisan recognizes that the numerous variables (e.g., the angle at which the sheet is pulled from the surface, whether fingernails are applied to the sheet surface, the speed with which the sheet is peeled, the temperature of the shaped article at the time of peeling) can affect the peeling characteristics of the sheet, and the materials described herein include all materials that are operable under the ambient conditions corresponding to anticipated uses of the materials and shaped articles.

To the extent that an objective measure of the force needed to peel a sheet from an underlying substrate surface is desired, a standardized test of peel strength can be used. An example of a suitable test is ASTM D3330/D3330M, which is a standardized test for peel adhesion of pressure-sensitive tape. A modification of this procedure (e.g., substituting a sheet of the substrate material in place of the standard steel sheet in ASTM D3330/D3330M and selecting a peel angle appropriate for the intended use of the shaped article being tested) can also be used. In each case, the characteristics of the shaped article or stack should be selected such that the peel strength of the finished article is within the limits of human strength.

Various surface treatments and polymer sheet ingredients can be used to affect the surface energy.

In one embodiment of the stack and shaped articles described herein, multiple adjacent polymer sheets are made of the same material. Unless treated non-identically, the two faces of a polymer sheet will normally have the same surface energy. Therefore, in stacks and articles which include multiple identical polymer sheets, it is important that the two faces of the identical polymer sheets be treated differently, so as to yield a polymer sheet having different surface energy values for each of its two faces. Such sheets are preferably treated such that the surface energies of their faces differ by 5 Dynes or more. Many compositions and methods for affecting the surface energy of polymer sheets are known to skilled artisans in this field, and substantially any of those methods may be employed. Such methods include conventional surface finishing techniques such as grinding and polishing, annealing processes, Corona treatment, and plasma contact techniques such as atmospheric, chemical, and flame plasma techniques. Compositions for affecting the surface energy of a surface of a polymer sheet are also well known, and include compounds that can be contacted or reacted with the surface to modify its chemical or physical properties (affecting its surface energy).

An example of a suitable surface treatment is the process known as Corona treatment or Corona discharge treatment, which involves application to a surface of a high-frequency, high voltage electrical discharge. Corona treatment raises the surface energy of a polymeric surface. Applied to one face of a polymer sheet having two otherwise identical faces, Corona treatment will raise the surface energy of the face, relative to the opposite face of the sheet. The power applied in a Corona treatment can be controlled to limit the treatment substantially to one side of a sheet. At very high power, the treatment can raise the surface energy of both faces of the same sheet which, in the absence of other surface treatments, will not yield a polymer sheet having different surface energies on its two faces, if a polymer sheet is Corona treated at or near the time it is formed, the surface energy-raising effects of the treatment can endure for weeks, months, or years. If the sheet is Corona treated days, weeks, or later after the sheet is made, the surface energy-raising effects of the treatment can be more transitory (e.g., enduring only for days or weeks). Polymer sheets that are Corona treated at or very near the time they are formed can be used in the stacks and articles described herein. Polymer sheets can also be "bump-treated" (i.e., be Corona treated regardless of how long it has been since the sheet was formed) shortly before making the stacks and articles described herein.

Barrier Compositions

The identity and composition of barrier compositions interposed between polymer sheets used in the articles and methods described herein are not critical. A skilled artisan will recognize that substantially any material can be used as a barrier composition between two polymers, so long as it substantially prevents fusion of two polymers under conditions at which at least one of the polymers can be thermoformed. A wide variety of such compositions are known for this purpose.

Examples of suitable barrier compositions include adhesives (e.g., peelable adhesives such as pressure-sensitive adhesives), known polymer release agents, a polymeric or paper film interposed between polymer layers, and various liquids, including low-viscosity silicone oils.

A composition interposed between two surfaces (e.g., between the first and second polymer sheets, or between two second polymer sheets, as described herein) can act as a barrier composition between the two surfaces if the composition coats at least one of the two surfaces at a thermoforming condition, thereby preventing surface-to-surface contact and fusion of the two surfaces at the thermoforming condition.

A barrier composition prevents fusion of opposed polymeric surfaces only when it is interposed between the surfaces at the thermoforming condition. For that reason, the barrier composition must be interposed between the surfaces over the entire area for which fusion between the surfaces is not desired. This can be achieved in various ways, including use of liquid and solid barrier compositions. When a stack is to be thermoformed to make a plurality of shaped objects that are not fused over some portions, but fused at least one portion (e.g., a stack of cookie trays fused only at a single, frangible extension of the trays at one corner), the barrier composition is interposed among the polymer sheets in the non-fused areas, but is not interposed between the polymer sheets in the area in which fusion is desired.

Liquid barrier compositions should be selected such that they completely coat (i.e., wet) at least one of the surfaces over the entire area for which fusion is not desired. This can be achieved by selecting a liquid barrier composition (i.e., a composition that is a liquid at least the thermoforming condition, regardless of whether it is a liquid at which it is contacted with the surface) that has a surface tension significantly greater (i.e., at least 2 Dynes, and preferably at least 10 Dynes greater) than the surface energy of the surface with which it is contacted. This surface energy difference should ensure that the liquid barrier composition completely wets (i.e., coats) the area of the surface for which fusion is not desired. Preferably, the liquid barrier composition has a surface tension significantly greater than the surface energy of both surfaces, so that the liquid is not displaced from between the surfaces at points at which the two surfaces are urged tightly against one another.

Solid barrier compositions (e.g., polymer sheets) should be selected so that the solid covers the entire area for which fusion is not desired. The identity of the solid is not critical, so long as it does not prevent the portions of a polymer sheet that are to be thermoformed from reaching the thermoforming condition. Solid barrier compositions can prevent fusion of the surfaces (and/or) fail to fuse to one or both surfaces for a variety of reasons, any of which are sufficient to render a material suitable as a solid barrier composition. Some solids can be predicted to act as suitable barrier compositions, while other may require empirical testing (e.g., thermoforming two sheets of the polymer with the solid interposed between them) in order to determine their suitability. Either way, selection of an appropriate solid barrier composition is within the ken of a skilled artisan in this field.

Another type of barrier composition that can be used is a composition incorporated as an additive into one or both of the polymer sheets. These compositions melt and "bloom" to the surface of a polymer when heated, pressed, stretched, or otherwise manipulated. If such a composition is included in one or both of the polymer sheets such that the composition blooms at the surface of at least one sheet at the thermoforming condition and prevents contact between the polymer sheets themselves, then the composition can be used as a barrier composition in the articles and methods described herein. A wide variety of compositions that exhibit such blooming behavior are known in the art.

Adhesives

Sheets can be non-adhered, adhered substantially only by non-chemical means (e.g., static charge attraction), or adhered by virtue of an adhesive interposed between the sheets. The identity and composition of adhesive interposed between polymer sheets used in the articles and methods described herein are not critical. A skilled artisan will recognize that substantially any material can be used as an adhesive between two polymers, so long as it reversibly binds the two polymer layers and requires no more force to separate the polymer layers than can be practically applied to the polymer layers by a person of ordinary strength. A wide variety of such compositions are known for this purpose.

The adhesives used between a peelable polymer sheet and an underlying surface are preferably peelable, meaning that the polymer sheet can be peeled from the surface by a person of ordinary strength, preferably without tearing or substantially stretching the sheet. Preferably, an adhesive having a coat weight of roughly 0.6 to 15 ounces per inch is used to adhere a peelable sheet to an underlying surface.

A wide variety of suitable adhesives are known in the art and can be used as described herein. Pressure-sensitive adhesives are among the suitable adhesives that can be used. Likewise, adhesives that adhere preferentially to one of two adhered surfaces, upon peeling of one of the surfaces away from the other) are suitable and are preferred in certain embodiments. By way of example, if an adhesive adheres more strongly to a peelable polymer sheet than to a surface to which the sheet is adhered by the adhesive, the adhesive will tend to remain with the sheet when it is peeled from the surface.

Various compounds and surface treatments can be used to reduce the force needed to pull an adhesive from a surface, and such compounds and treatments can be used to modulate adhesion of an adhesive to a surface described herein.

Specific examples of adhesives that can be used in the articles described herein include polysiloxane-based adhesives, rubber cement, and acrylic adhesives (e.g., waterborne pressure-sensitive, acrylic adhesives of the MULTI-LOK brand family of acrylic adhesives manufactured by National Adhesives of Bridgewater, N.J.).

Another class of adhesives that can be used are those which are capable of cohesively adhesing adjacent polymer sheets. Cohesive adhesives bind relatively tightly with the surface of each of the two adjacent sheets, such that the tensile strength of the bulk adhesive layer (i.e., the material between, but not contacting, the sheets) is less than the tensile strength of the adhesive-to-sheet interface at each of the two sheets. When two cohesively adhesed sheets are pulled apart, the separation will tend to occur within the adhesive layer (i.e., the adhesive layer will rupture, rather than delaminating from one or both sheets) by tearing of the adhesive, yielding two sheets, each having a portion of the adhesive layer remaining bound thereto.

Such cohesive adhesives can be useful in situations in which it is desirable to have visual evidence that the adhesive layer was present and that it was ruptured upon separation of the sheets (i.e., because the ruptured adhesive layer has or can be made to have an appearance significantly different than the appearance of the surfaces of the adhesed sheets). Thus, for example, two adjacent sheets having a cohesive adhesive completely encircling an area within the overlapping region will, when separated, exhibit ruptured adhesive residue surrounding the area, demonstrating to the user that the area was isolated (e.g., and sterile or not including environmental material that may have contacted the rest of the sheets) prior to separation of the sheets.

Cohesive adhesives are relatively well known in the art, and their selection and use does not require any special skill above what is disclosed herein. Examples of suitable cohesive adhesives include polybutenes and mixtures of polybutenes and polyolefins. Cohesive adhesives can be formed by combining a first polymer that exhibits adhesive qualities with a second (not necessarily adhesive) polymer that is poorly miscible (or immiscible) with the first polymer.

If the stack includes a cohesive adhesive between polymer sheets (or as a layer within a polymer sheet) of the stack, the cohesive adhesive may act as a barrier composition as well, provided its nature and thickness prevent fusion between the polymer sheets bound by the cohesive adhesive. Thus, for example, the stack can include multiple thermoformable polymer sheets having a ring of cohesive adhesive applied between adjacent sheets at the same position within the overlapping region, such that if the stack is thermoformed to have the shape of a round bowl within the ring, the thermoformed stack can be trimmed at or near the ring to yield a stack of separable, nested bowls, with the interior of each bowl but the uppermost having a cohesive seal isolating it from the environment so that a user can confirm that isolation by observing an appearance change in the corresponding seal upon peeling a bowl from the stack.

Cohesive adhesives can be assembled within the stack in any form. By way of example, a cohesive adhesive in liquid form can be applied (e.g., with a brush, roller, or by spraying or extruding) onto a face of a polymer sheet as that sheet as being incorporated into the stack. By way of an alternate example, a cohesive adhesive can be introduced into the stack in the form of a solid sheet or film made from (or including as a layer thereof) the adhesive.

Disassemblable Stacks Lacking a Barrier Composition

Stacks of separable, nested articles described herein can be made by thermoforming stacks that include thermoformable polymer sheets which lack any barrier composition between them. However, such stacks must assembled so that adjacent sheets (whether monolithic polymer sheets or multi-sheet laminates) have compositions that do not fuse when thermoformed. By way of example, most polypropylenes (PPs) and PETs will not fuse under thermoforming conditions, even when a PP surface and a PET surface are compressed together at the thermoforming condition. Similarly, most polyethylenes (PEs) and PETs will not fuse under thermoforming conditions, nor will polyvinyl chlorides (PVCs) and PEs. If such non-fusing thermoformable polymer sheets are thermoformed together and adjacent to one another, the resulting articles will be separable from one another and little or no force will normally be required to effect such separation. The non-fusing properties of dissimilar polymer materials can thus be used to prevent fusion of adjacent polymer sheets in the method described herein, even if there is no barrier composition between the sheets during thermoforming.

Printing

Text, images, or other graphical material can be printed onto one or more faces of one or more of the polymer sheets described herein. A wide variety of materials and methods can be used to print such material onto the surface of a polymer sheet. A difficulty inherent in printing on polymer materials is that the printed matter can often easily be displaced from the polymer surface by heat, light, or mechanical abrasion, leading to reduced print quality. Furthermore, it can be undesirable for the materials used for printing to contact materials that will be in contact with the polymer. For example, it can be undesirable to have printing inks contact paint on the interior surface of a paint tray. These effects can be avoided by applying a clear polymer sheet or layer over top of the printed matter, thereby securing it in place and preventing its displacement. However, the clear layer often cannot be peeled off without severely damaging the printed matter and/or leaving portions of the printed matter on the peeled sheet and the underlying surface.

In one embodiment of the stacks and shaped articles described herein, printed matter is incorporated between polymer sheets and is peelable coherently with one sheet. In this embodiment, the printed matter is printed (preferably "reverse" printed, in that the printed matter is intended to be viewed through the sheet, rather than by viewing the printed surface of the sheet) onto the face of a clear (or at least translucent or not-completely-opaque) polymer sheet, and that face of the clear sheet is adhered to an underlying sheet. The tenacity with which the printed matter clings to the clear sheet and the tenacity to which adhesive overlying the printed matter clings to the printed matter (and thence to the clear sheet) is greater than the tenacity with which the adhesive overlying the printed matter adheres to the underlying sheet. Thus, when the clear sheet is peeled away from the underlying sheet, the printed matter (and the adhesive overlying it) come away with the clear sheet, leaving the underlying surface free of adhesive and/or printed matter.

The tenacity of binding of printed matter to a polymer sheet can, as described herein for adhesives, be affected by surface treatment of the polymer sheet prior to printing upon it. Corona treatment and plasma discharge techniques, for example, can raise the surface energy of a polymer surface, rendering it susceptible to more tenacious binding by the printed matter. Likewise, surface treatment (e.g., Corona treatment) of a polymer surface having printed matter thereon can raise the surface energy of the surface (including the portion on which the printed matter appears). By applying to the printed portion of the surface an adhesive that adheres more tenaciously to the printed portion than to the opposed underlying surface, adhesion of the adhesive with the printed matter can be maintained upon peeling of the sheet carrying the printed matter from the underlying surface.

In another embodiment, a release agent can be interposed between adhesive contacting a sheet having printed matter carried thereon and an opposed surface. The release agent overlies the printed matter and prevents (or weakens) binding between the adhesive that contacts that printed matter and the portion of the opposed surface that is adjacent the printed matter on the sheet. When the sheet is peeled from the surface, the poor (or lack of) adhesion between the sheet and the surface in the region where the printed matter occurs prevents damage to the printed matter, which is peeled off with the sheet.

Thermoforming Apparatus and Conditions

The articles described herein can be made using known thermoforming apparatus and conditions. Of course, the apparatus and conditions should be selected based on the identity and the characteristics of the materials to be processed. Selection of appropriate thermoforming conditions, based on the identity(ies) of the materials to be processed is within the ken of a skilled artisan in this field.

Paint Trays and Other Thermoformed Articles

In one embodiment, the subject matter disclosed herein includes a paint tray with a plurality of pee table liners that are simultaneously thermoformed with the tray, with the liners being thermoformed to the shape of the tray interior surface at the same time the tray is formed. As used herein, the term "thermoformed" is intended to encompass various methods of shaping a thermoplastic sheet or stacked sheets by heating the sheet and applying a pressure differential to the opposed side of the sheet to conform the sheet to the shape of a mold surface.

While the subject matter of this disclosure is occasionally described in terms of the preferred embodiment of simultaneously thermoforming a substrate and a plurality of liner sheets or simultaneously thermoforming a plurality of similar thin wall substrates with a release agent/barrier on the inner or bottom surface, it will be understood after reading the disclosure that the subject matter also includes simultaneously forming a substrate and a single liner sheet, and shaping the liner sheets and substrate by other means, e.g., by stamping, injection molding or blow molding. The substrate, while preferably a thermoformable plastic, may also be of other materials, e.g., metals.

In one example of thermoforming known as vacuum molding, a sheet is positioned adjacent a female (or male) mold section and a vacuum is applied to draw the sheet against the mold surface. A male mold section may be pressed against the sheet on the opposite side of the sheet from the female mold section to assist in conforming the sheet to the shape of the female mold section. In other processes, such as pressure forming, the heated sheet is pressed against a male mold section (or, more frequently, into a female mold section), usually with the assistance of a vacuum to conform the sheet to the mold shape.

In a preferred embodiment of the subject matter disclosed herein, a plurality of stacked planar sheets of thin plastic serving as disposable liners ("liner sheets") are positioned on a surface of a planar substrate sheet of a greater thickness to be formed into a paint tray. The combination of a stack of liner sheets and a single substrate makes a "tray sheet". The liner sheets will preferably be significantly thinner than the substrate sheet, e.g., the liner sheets may be from about 1 mil to about 6 mils thick, while the substrate sheet may be from about 10 mils to about 40 mils thick.

Each liner sheet has an adhesive on its inner or bottom surface to secure the liner sheets to the immediately adjacent sheet, with the innermost or bottom liner sheet being adhered to the top surface of the substrate sheet. Preferably, the adhesive backing is a uniform coating of adhesive over the entire inner surface of the sheets except where tear tabs are located. While applying the adhesive in making the liner sheets, the tabs can be added in line, anywhere in part or whole around the perimeter of where the tray will be formed. This is done by deadening the adhesive. Tabs are applied to each liner sheet to facilitate separation of the sheets. Suitable adhesives will be apparent to one skilled in the art, the requirement being that the adhesive is a peelable adhesive, i.e., an adhesive that will permit separation of one liner sheet from another liner sheet or the substrate without tearing the liner sheet.

The tray sheets can be shipped in either sheet form or roll form. For convenience in shipping, storage, and thermoforming, the tray sheet may be provided to the thermoformer in a continuous roll form ("master pad roll"). The roll can be continuously fed through the thermoformer, with each length of tray sheet being indexed, then thermoformed into a shape, i.e., paint tray. The roll length and width can be as desired. For example, the master pad roll can be 5" to 48" in width. As another example, the master pad roll can be 60" in width.

The combined stack of sheets (tray sheets), is thermoformed as a unit into the shape of the desired product, e.g., a paint tray with the liner sheets being on the interior of the paint tray. Upon cooling, the tray sheet maintains its thermoformed configuration due to the thickness of the substrate sheet, while the configuration of the liner sheets is assisted by the presence of the adhesive backing.

The paint tray is used like one would use an ordinary paint tray that does not have a liner. However, unlike the prior art trays described above, there is no need to place a preformed liner into the tray or attempt to hand shape a sheet of thin plastic to conform to the tray interior. After use, the upper liner sheet can be simply peeled away along with the paint residue, exposing the next liner sheet as a clean paint tray ready for use.

The mold, and thereby the thermoformed tray system, can be of various shapes. Generally, the resultant tray will have an open-top interior cavity with a floor and continuous side walls. The paint tray may include at least one paint well and a flat section, normally ridged, for removal of excess paint from a roller dipped into paint within the paint well. In a preferred embodiment, the improved tray may be comprised of two paint wells divided by a horizontal, flat central section so that paint can be placed in both wells. The flat section is connected to opposed ramps tapering upwardly from the paint wells.

In another embodiment of the subject matter disclosed herein, multiple containers such as plastic egg cartons, cookie trays (e.g., Oreo), dessert gelatin containers, blister packs, rigid paint tray liners etc., are produced by simultaneously thermoforming multiple layers of plastic sheets having the same thickness. Sheets used in this application are generally from about 0.006" to about 0.025" thick. Preferably, a stack of sheets, e.g., from 4 to 6 sheets, are provided to the thermoformer in roll form. A release agent, e.g., a coating, adhesive barrier or release film is applied between the sheets to prevent the sheets from melting/bonding together during the thermoforming process, and to allow the finished containers to be separated easily (e.g., a form of silicone may be introduced between the layers of sheets. A zone coat of adhesive (e.g., 1 inch wide) may be applied along the edge of the substrate to allow for easier transport of the rolls of substrates and sheets by keeping the material together in roll form more effectively. Stacks of sheets are thermoformed by being drawn or pressed into a mold having the desired cavity shape.

Descriptions of Embodiments Illustrated In the Drawings

Figure 2:
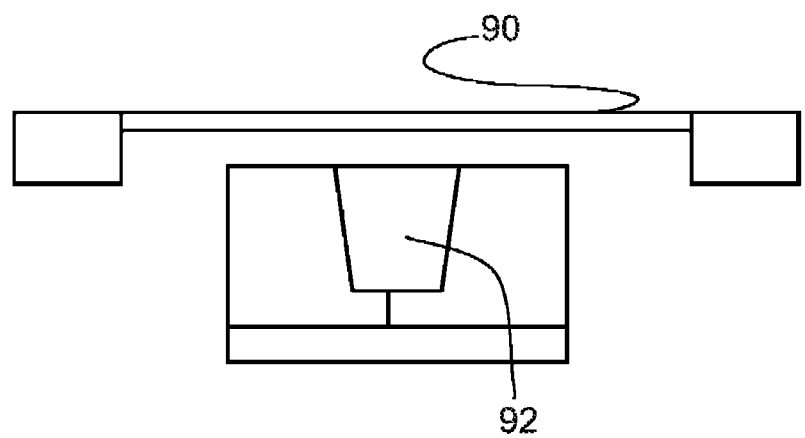
FIG. 2 is a sectional side view of a stack of thermoformable polymer sheets in preparation for molding into a female cavity mold.
Figure 3:
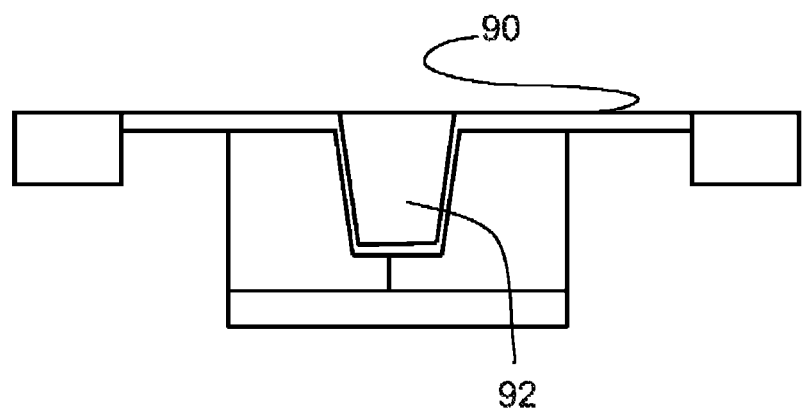
FIG. 3 is a sectional side view of a stack of thermoformable polymer sheets molded into a female cavity mold.

In an embodiment illustrated in FIGS. 1-3, multiple layers of thermoformable plastic sheets 90 having the same thickness, are thermoformed simultaneously, in order to make multiple products. Applied applications for this would be various containers such as plastic egg cartons, cookie trays, dessert gelatin containers, computer keyboard covers, blister packs, rigid paint tray liners, and the like. The thermoformable plastic sheets 90 in this process preferably have a thickness less than 0.030", but not less than about 0.006".

This latter process ideally uses about 3 to 6 layers in roll form. Currently the maximum thickness to thermoform (in roll form) effectively is around 0.050." A coating, adhesive barrier, release agent, or film will be applied to or placed in between the sheets where needed and in any combination to prevent the sheets from melting/bonding together in the thermoforming process, and for allowing the finished products to be separated easily (e.g., a form of silicone may be introduced between the layers of sheets while a zone coat of adhesive (e.g., 1 inch wide) may be applied along the edge of the substrate). This adhesion allows for easier transport of the roll of sheets by keeping the material together in roll form more effectively. Multiple sheets of approximate thickness 0.010" each are stacked together with a barrier/adhesion between each layer. The multi-sheet layers are rolled together and then sold to various thermoforming companies. Ultimately time and money are saved by the thermoformers, allowing them to be more efficient. Sheets 90 are thermoformed by being drawn or pressed into a mold 92 having the desired cavity shape.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A method of forming nested, separable, thermoformed articles, the method comprising assembling a stack comprising a plurality of polymer sheets that are thermoformable at a thermoforming condition, that overlap in an overlapping region, and that includes at least two adjacent sheets having surface layers of dissimilar plastics that do not fuse to one another at the thermoforming condition, and thermoforming the assembled stack at the thermoforming condition, whereby the stack assumes the shape of the articles and the adjacent sheets are separable from one another in the overlapping region following thermoforming to yield the nested, separable articles wherein the composition of the sheets is selected such that each article exhibits sufficient rigidity to retain its shape following thermoforming and sufficient toughness to resist tearing under conditions necessary to separate the articles; and the composition of the stack is selected such that each sheet in the stack is incorporated into a thermoformed article at the thermoforming condition.

2. The method of claim 1, wherein neither of the adjacent sheets is thermoformable at the thermoforming condition.

3. The method of claim 1, wherein at least one of the adjacent sheets is thermoformable at the thermoforming condition.

4. The method of claim 3, wherein each of the adjacent sheets is thermoformable at the thermoforming condition.

5. The method of claim 1, wherein one of the two adjacent sheets has a surface layer composed of a first plastic, the second of the two adjacent sheets has a surface layer composed of a second plastic that does not fuse with the first at the thermoforming condition, and the surface layers of each of the two adjacent sheets are opposed on opposite sides of a gap.

6. The method of claim 5, further comprising removing substantially all gas from the gap prior to thermoforming the stack.

7. The method of claim 6, wherein the gas is removed from the gap by compressing the stack.

8. The method of claim 6, wherein the gas is removed from the gap by reducing the atmospheric pressure within the gap.

9. The method of claim 8, further comprising compressing the stack.

10. The method of claim 5, wherein at least one of the adjacent sheets is a multilaminar sheet that comprises multiple layers laminated such that they do not delaminate at the thermoforming condition.

11. The method of claim 5, wherein the gap contains no solid or liquid and wherein the stack includes multiple identical multilaminar sheets adjacent one another.

12. The method of claim 11, wherein each multilaminar sheet includes a base sheet layer at one face and a top sheet layer at the other face, wherein the base sheet layer and the top sheet layer do not fuse when compressed against each other at the thermoforming condition.

13. The method of claim 1, wherein a composition is interposed in a barrier layer between the two adjacent sheets as the stack is thermoformed, the barrier layer forming a frangible layer between the adjacent sheets following thermoforming.

14. The method of claim 13, wherein the barrier layer is a polybutene.

15. The method of claim 1, wherein
at least a first polymer sheet is provided in rolled form;
the stack is assembled by
  unrolling a portion of the first sheet from its rolled form,
  situating the unrolled portion of the first sheet such that it overlaps in the overlapping region with the other polymer sheets, and
  urging the unrolled portion of the first sheet and the other polymer sheets against one another in the overlapping region sufficiently to substantially remove gases from between the sheets; and
the assembled stack is thermoformed at at least the overlapping region.

16. The method of claim 1, wherein
each of the polymer sheets is provided in a rolled form;
the stack is assembled by
  unrolling a portion of each sheet from its rolled form,
  situating the unrolled portions of the sheets such that the unrolled portions overlap in the overlapping region, and
  urging the unrolled portions of the polymer sheets against one another in the overlapping region sufficiently to substantially remove gases from between the sheets; and
the assembled stack is thermoformed at at least the overlapping region.

* * * * *